(12) United States Patent  (10) Patent No.: US 6,826,485 B1
Bale et al.  (45) Date of Patent: Nov. 30, 2004

(54) DETERMINATION OF THE FAST AND SLOW SHEAR WAVE POLARISATION DIRECTIONS

(76) Inventors: Richard Bale, 4924 Viceroy Place NW, Calgery, Alberta (CA), T3A 0V1; Alina Gabriela Dumitru, 145 Hillcrest, Bar Hill, Cambridge, CB3 8TH (GB)

( * ) Notice: Subject to any disclaimer, the term of this patent is extended or adjusted under 35 U.S.C. 154(b) by 0 days.

(21) Appl. No.: 10/130,027

(22) PCT Filed: Oct. 20, 2000

(86) PCT No.: PCT/GB00/04037

§ 371 (c)(1),
(2), (4) Date: Aug. 12, 2002

(87) PCT Pub. No.: WO01/36999

PCT Pub. Date: May 25, 2001

(30) Foreign Application Priority Data

Nov. 17, 1999 (GB) .............................................. 9927052

(51) Int. Cl.$^7$ ............................. G06F 19/00; G01V 1/00
(52) U.S. Cl. ........................................... 702/14; 367/75
(58) Field of Search .............................. 702/14; 367/75

(56) References Cited

U.S. PATENT DOCUMENTS

| | | | |
|---|---|---|---|
| 4,803,666 A | | 2/1989 | Alford |
| 4,817,061 A | | 3/1989 | Alford et al. |
| 4,888,743 A | * | 12/1989 | Thomsen ..................... 367/75 |
| 5,142,501 A | * | 8/1992 | Winterstein .................. 367/75 |
| 5,610,875 A | | 3/1997 | Gaiser |
| 5,657,294 A | * | 8/1997 | Zhang .......................... 367/75 |
| 5,835,452 A | | 11/1998 | Mueller et al. |
| 6,067,275 A | | 5/2000 | Sayers |
| 6,292,754 B1 | | 9/2001 | Tomsen |
| 2003/0109989 A1 | | 6/2003 | Bagaini et al. |

FOREIGN PATENT DOCUMENTS

EP  0 518 308 A1  6/1992

OTHER PUBLICATIONS

"Shear–Wave Splitting at Vertical Incidence in Media Containing Intersecting Fracture Systems", Ramos–Martinez et al., SEG Expanded Abstracts, 1998.*
"A New Algorithm for the Rotation of Horizontal Components of Shear–Wave Seismic Data", Fang et al., CREWES Research Report, vol. 8, 1996.*
"Algebraic Processing Techniques for Estimating Shear–Wave Splitting", Zeng et al., British Geological Survey, P088, Unknown Date.*
Walden, A.T., "Non–Gaussian reflectivity, entropy, and deconvolution" Geophysics, Dec. 1985, USA, vol. 50, No. 12, pp. 2862–2888.
International Search Report for International Application No. PCT/GB00/04037 dated May 30, 2001.
International Preliminary Examination Report for International Application No. PCT/GB00/04037 dated Oct. 29, 2001.
Patents Act 1977: Examination Report under Section 18(4) dated Feb. 28, 2003.

* cited by examiner

*Primary Examiner*—John Barlow
*Assistant Examiner*—Toan M. Le

(57) ABSTRACT

A method of determining the polarisation directions of the fast and slow shear waves arising from shear wave splitting due to anisotropy, said directions defining a natural coordinate system, the method comprising the steps of:

a) recording at least two components of each shear wave, in a recording coordinate system, b) calculating the value of θ, being the angle of rotation between the natural coordinate system and the recording coordinate system, for which the $L_p$ norm of the rotated traces is minimised if p is less than 2, or maximised if p is greater than 2.

11 Claims, 4 Drawing Sheets

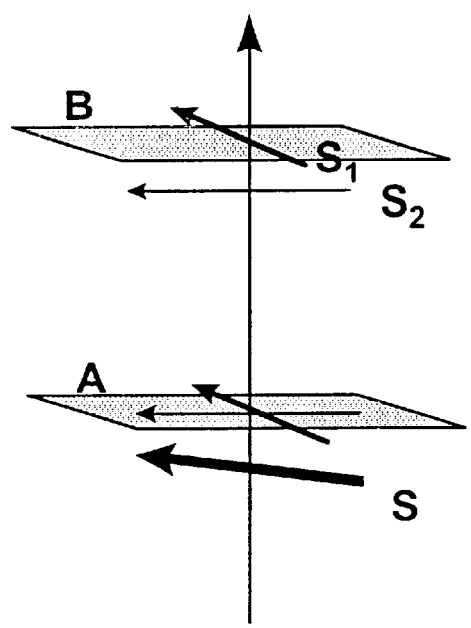
Figure 1
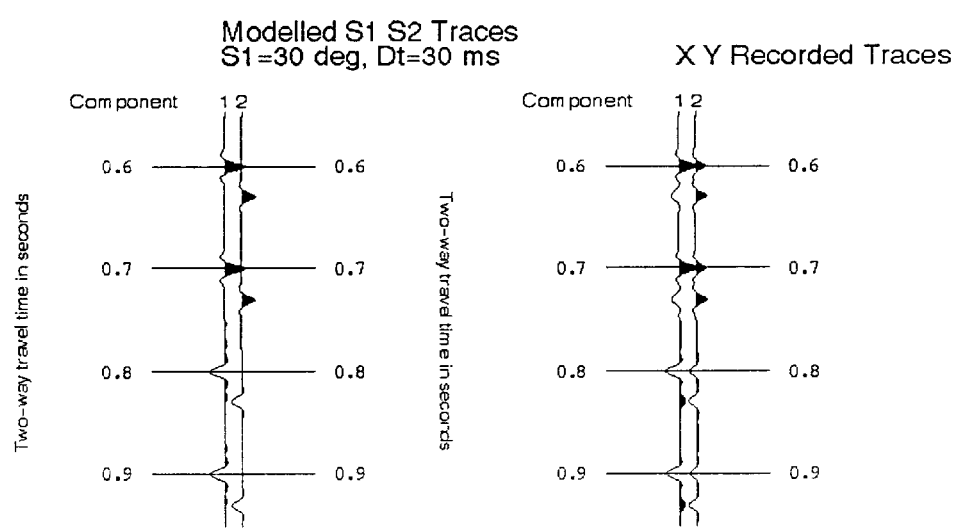
Figure 2a
Figure 2b

DETERMINATION OF THE FAST AND SLOW SHEAR WAVE POLARISATION DIRECTIONS

The invention relates to the determination of the polarisation directions for the fast and slow shear waves arising from shear wave splitting due to anisotropy.

There are generally two types of seismic waves used in seismology, namely so-called "P-waves" or compressional waves in which the vibrations occur in the direction of propagation of the waves, and so-called "S-waves" or shear waves in which the vibrations occur in a direction generally orthogonal to the direction of propagation of the waves.

A multicomponent geophone is a directional detector for seismic waves, which includes a vector measurement of the incoming wave. In the applications considered here, two of the geophone components are assumed to be aligned along arbitrarily chosen X and Y directions, generally parallel to the surface of the earth. It is also assumed that the incoming shear waves will generally arrive vertically (i.e. perpendicular to the surface of the earth) from below the geophones. As a result the particle motion within the wave is generally parallel to the surface of the earth, and is detected by the X and Y geophone components.

Furthermore, as will be explained below, the incoming shear waves may contain two components which are polarised (in terms of the direction of vibration) in two orthogonal directions, S1 (i.e. the fast shear $S_1$ propagation direction) and S2 (i.e. the slow shear $S_2$ propagation direction), and which are separated from each other by a time delay. This specification is concerned with the determination of these two directions and the travel time delay between the corresponding shear waves.

From ocean bottom or land multicomponent surveys using a P-wave source, it is possible to obtain measurements of the shear waves converted in the earth. These shear waves appear predominantly on the horizontal (X and Y) components of the multi component geophones. If the earth is isotropic with respect to the horizontal direction of wave motion, then a single shear arrival may be expected for each reflecting interface. If however, as is often the case, the earth behaves anisotropically with respect to the horizontal direction (for example, because a geological layer is polarised in a particular direction due to fracturing), then we can expect to record two separate shear wave arrivals from each reflecting interface, arriving at different times, having propagated with different velocities. These are usually termed the fast ($S_1$) and the slow ($S_2$) shear waves, corresponding to the first and the second arrivals, respectively. They are also characterised by having different polarization directions (i.e. directions of particle motion in the horizontal plane), which in most cases are considered to be approximately orthogonal to each other. It is assumed that this is the case here.

The shear wave splitting phenomenon is illustrated in FIG. 1, which depicts a shear wave arrival (S) that, at the start (A) of an anisotropic medium, splits into two separate shear waves ($S_1$ and $S_2$), having different polarisation directions and propagating separately with differing velocities until the end (B) of the medium. If from (B) onwards the medium is supposed to be isotropic, the two polarised waves will continue to travel separately but with the same velocity until they impinge upon the recording geophones. The amplitudes recorded on each of the horizontal components of the geophone depend upon the orientations of the S1 and S2 directions relative to the X and Y directions.

FIG. 1 gives a simple graphical description of the principle of shear wave birefringence, by only considering one anisotropic layer imbedded in an isotropic medium. However, in reality there are many reflecting boundaries that give rise to a number of shear arrivals polarised in the S1 and S2 directions. In addition, these S1 and S1 directions can change between the different anisotropic layers. In the applications considered here, the S1 and S2 polarisation directions are assumed to be constant with depth, over the analysing time window.

According to the invention, there is provided a method of determining the polarisation directions of the fast and slow shear waves arising from shear wave splitting due to anisotropy, said directions defining a natural coordinate system, the method comprising the steps of:

a) recording at least two components of each shear wave, in a recording coordinate system, b) calculating the value of θ, being the angle of rotation between the natural coordinate system and the recording coordinate system, for which the $L_p$ norm is minimised if p is less than 2, or maximised if p is greater than 2.

In one embodiment of the invention, said value of θ is determined by calculating the value of the $L_p$ norm over a range of incrementally varying values of θ, and selecting that value of θ for which the $L_p$ norm is appropriately minimised or maximised.

In a further embodiment of the invention, p is 4, and the value of θ is determined analytically from an equation derived by differentiating the $L_p$ norm with respect to θ.

The two recorded components of each shear wave are sampled, for example, at about 4 ms intervals.

Preferably, the fast and slow shear waves are recorded using two orthogonal geophones, arranged generally parallel to the surface of the earth.

The fast and slow shear waves may be produced from a single source.

Said source may be a P-wave source or it may be a single shear source.

Said shear wave components are conveniently horizontal components.

The invention also includes apparatus for carrying out the above method, and a computer readable medium carrying a computer program for carrying out the above data processing steps.

The invention will now be more particularly described, by way of example only, with reference to the accompanying drawings, in which:

FIG. 1 shows shear wave splitting through an anisotropic medium;

FIG. 2a shows $S_1$) and $S_2$ traces (synthetically generated, as they would be recorded by geophones aligned with the natural coordinate system defined by the S1-S2 directions), with 30 ms travel time delay between the fast and the slow shear waves, and in which S1 is 30 degrees from the horizontal X axis of the recording system;

FIG. 2b shows X and Y recorded traces (synthetically generated, as they would be recorded by geophones aligned with the actual recording system, and corresponding to the measurements of arrivals in FIG. 2a);

Figure 3:
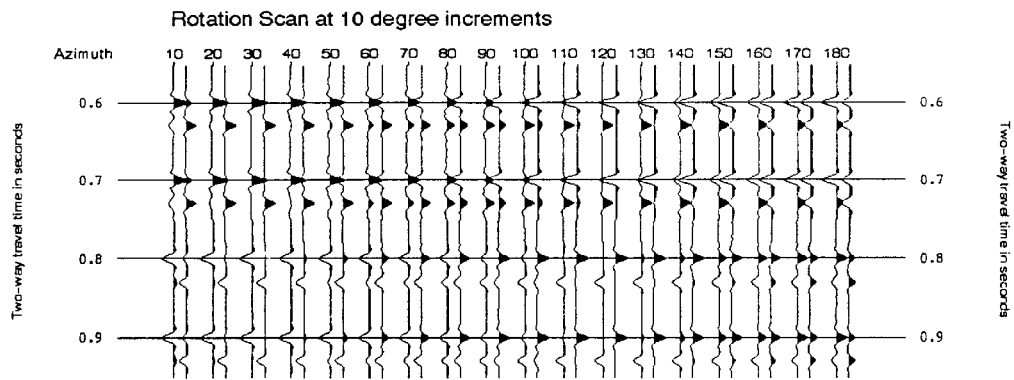
FIG. 3 shows pairs of $X^R$ and $Y^R$ rotated traces after rotation of the X and Y recorded traces by angles ranging from 10 to 180 degrees, in which the $S_1 S_2$ response is fully recovered when the angle used for the rotation is correct, in this case 30 degrees.

A number of methods have been proposed to determine the orientations of $S_1$ and $S_2$ shear waves and the corresponding travel time delay between them by using the recorded arrivals. Most of these methods rely upon having two shear sources with differing alignments, giving four independent measurements from two receiver components (e.g. Alford rotation, cf. Alford, 1986). The present specification is concerned with the case of a single source, typically generating P-waves, but possibly generating S waves. The S1 and S2 directions are estimated using just two independent measurements from the horizontal X and Y components of a multicomponent geophone.

The problem is illustrated in FIGS. 2a and 2b. FIG. 2a shows a simple example of $S_1$ and $S_2$ arrivals in the "unknown" natural S1-S2 coordinate frame, determined by the anisotropic layer from which reflection takes place. The $S_1$ and $S_2$ traces are generated synthetically, as they would be recorded by geophones aligned with the S1 and S2 directions. FIG. 2b shows the traces corresponding to the measurement of the arrivals in FIG. 2a, recorded by geophones aligned with the actual X and Y recording directions. Following a convention in this field, the positive signals are "filled in" in black ink, and the negative signals are not. In FIG. 2a, each pair of pulses (one on $S_1$ and the other on $S_2$) corresponds to a reflection from a different anisotropic layer. The two pulses are separated by a time delay because, due to their different polarisation directions, they travel at different speeds within the anisotropic layer.

It can be seen that traces in the S1-S2 coordinate system is a "simpler" more "parsimonious" representation of the particle motion than those in the X-Y coordinate system, in the sense that each reflector only gives rise to a single event on the $S_1$ trace and a single event on the $S_2$ trace, whereas there are two events on the X and Y recorded traces for each reflection (due to the fact that each one of the two shear waves are recorded by both the X and Y geophones). In seismic, and other signal processing fields, the simplest representation is sometimes referred to as the "minimum entropy" representation, by analogy with thermodynamics. For this reason, the method described here may be termed the Minimum Entropy Rotation (MER).

Parsimony can be measured by using a "norm". As an example, let us consider the $L_1$ norm. For each trace (typically sampled at about 4 ms intervals), the $L_1$ norm is computed by summing the absolute values of the trace samples. The most parsimonious form of the trace is that which has the lowest $L_1$ norm. This principal is used in seismic analysis to perform "sparse spike inversion".

The $L_1$ norm example can be generalised by using the linear p-norm $L_p$ which, for a trace $X=\{x_1, x_2, \ldots, x_N\}$, can be written as:

$$L_p = \left( \sum_{i=1}^{N} |x_i|^p \right)^{\frac{1}{p}} \quad (1)$$

where in all the following formulas N is the number of samples in the trace, and p is a real number. In the case of 2-component data, with traces X and Y, the norm can be calculated using samples from both traces:

$$L_p = \left[ \sum_{i=1}^{N} (|x_i|^p + |y_i|^p) \right]^{\frac{1}{p}} \quad (2)$$

Another measure of parsimony previously used in seismic (for single component data only) is the "varimax norm" (Wiggins, 1977) defined by the ratio of the fourth moment to the second moment squared:

$$V(X) = \frac{\sum_{i=1}^{N} x_i^4}{\left( \sum_{i=1}^{N} x_i^2 \right)^2} \quad (3)$$

In statistics this is referred to as "Kurtosis". In terms of linear norms, the varimax norm is the fourth power of $L_4/L_2$. The most parsimonious result is obtained when the varimax norm attains its maximum value.

Wiggins first used this measure of parsimony to determine the parameters of the deconvolution operator that best improves trace resolution. In this view, a seismic deconvolution operator is determined such that, when applied to a seismic trace, it produces an output with the greatest varimax norm. This method is known as the "minimum entropy deconvolution" (Wiggins, 1977).

In the following, we describe and compare different approaches developed to determine the shear wave splitting parameters for a computer generated model of the $S_1$ and $S_2$ traces. We start with a scanning approach over the recorded traces rotated by differing angles, and then make use of the $L_p$ norm defined above, for different values of p.

FIG. 3 shows the result of rotating the X and Y traces of FIG. 2b by differing angles. It can be seen that the traces corresponding to the 30 degrees rotation are similar to those shown in FIG. 2a. Thus, when the correct rotation angle is applied, the $S_1$ and $S_2$ response is recovered.

For estimation of an unknown pair of axes S1 and S2, which in most cases are rotated relative to the X-Y frame, we calculate the combined norm of the X and Y traces. We may make use of any norm other than $L_2$, as this is invariant under rotation, and thus not useful. If using a $L_p$ norm with p<2, it is necessary to find the angle θ that minimises the norm, while if a $L_p$ norm with p>2 is used, it is necessary to maximise the norm in order to find the angle θ corresponding to the desired rotation, namely the angle θ between the S1-S2 and X-Y coordinate systems.

The principle is illustrated using the $L_1$ norm.

The $L_1$ norm of the i-th trace sample of the rotated traces, $X^R$ and $Y^R$, is written for each angle θ as follows:

$$l^{(1)}{}_i(\theta)=|x_i^R(\theta)|+|y_i^R(\theta)|=|x_i \cos\theta+y_i \sin\theta|+|x_i \sin\theta-y_i \cos\theta|, \quad (4)$$

where $x_i$ and $y_i$ are the recorded trace samples of the X and Y traces respectively, θ is the proposed angle between X-Y and S1-S2 coordinate systems, and $x_i^R$ and $y_i^R$ are the rotated trace samples.

The total $L_1$ norm over a time window with N samples is then written as:

$$L_1(\theta) = \sum_{i=1}^{N} l^{(1)} i(\theta) \quad (5)$$

This norm is minimised when the rotated traces are in their simplest form, which is when the angle θ is that of the S1 or S2 directions, relative to the X or Y axes of the recording system. This can be seen by reference to FIG. 3.

Figure 4:
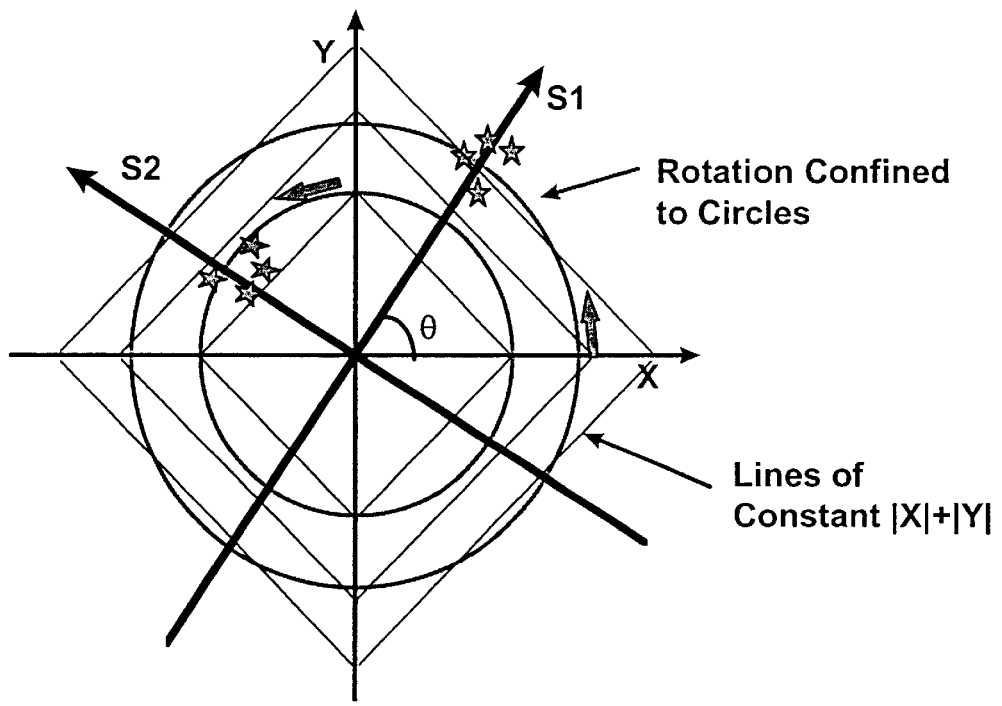
FIG. 4 illustrates that rotation of the X and Y axes to the S1 and S2 directions is equivalent to moving trace samples, indicated by the stars, along circular paths with fixed distance from the origin.

FIG. 4 depicts the dependence on the rotation angle of the $L_1$ norm $|x_i^R|+|y_i^R|$. The stars represent trace samples from the $S_1$ and $S_2$ polarised arrivals. Applying a rotation of the X and Y axes to S1 and S2 directions is equivalent to moving the trace samples around circles towards the S1 and S2 axes. As the samples are rotated, their distance from the origin $(x_i^R)^2=(y_i^R)^2$ remains fixed. However, the sum of their absolute values varies with the rotating angle, attaining its minimum value after rotation by θ, the angle between the X axis and the S1 axis, or by θ+90, the angle between the X axis and the S2 axis. This is used to estimate the directions of the S1 and S2 axes corresponding to the fast S1 and slow S2 shear waves, respectively.

The $L_1$ contours of constant $|x_i^R|=|y_i^R|$ form diamond shapes as shown in FIG. 4. The minimum $L_1$ value for a fixed distance from the origin occurs when the rotation is equal to θ. Note that the $L_2$ contour of constant $(x_i^R)^2=(y_i^R)^2$ is in fact the confining circle.

Figure 5:
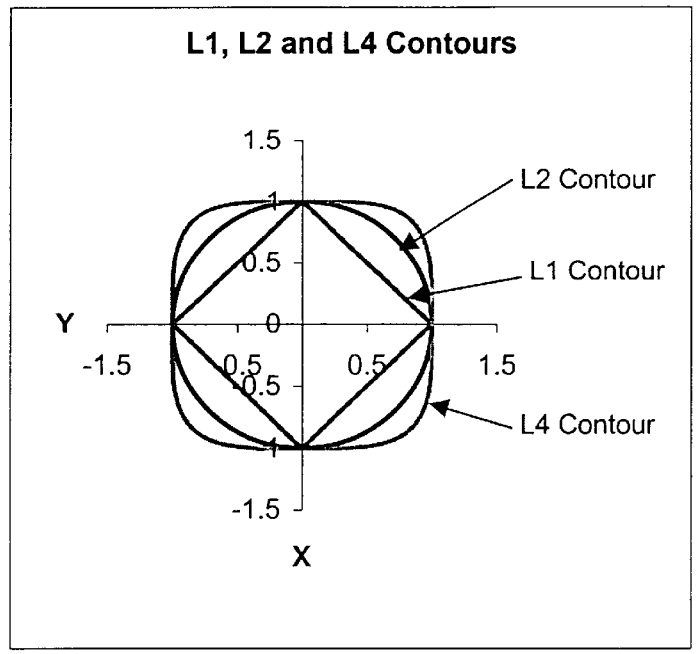
FIG. 5 shows a graphical comparison of constant L1, L2 and L4 norm contours.

The method described above exploits the fact that rotation moves data samples along circles (i.e. constant distance from the origin). Therefore, for the $L_2$ norm, the traces rotated to the differing angles are characterised by the same norm value, and so this norm cannot be use to determine the shear wave splitting parameters. The $L_1$ norm contours are diamond shaped, with their corners on the X and Y axes, attaining their minimum value (for a fixed distance from the origin) when data is rotated by the angle between X and S1 or S2. This is generally true for all the $L_p$ norms, having p<2. On the other hand, for p>2 the contours are more square shaped with the flatter sides on the X and Y axes. These norms attain their maximum value when data is rotated by the angle between X and S1 or S2. The $L_p$ norm shapes are illustrated for p=1,2,4 in FIG. 5.

Figure 6:
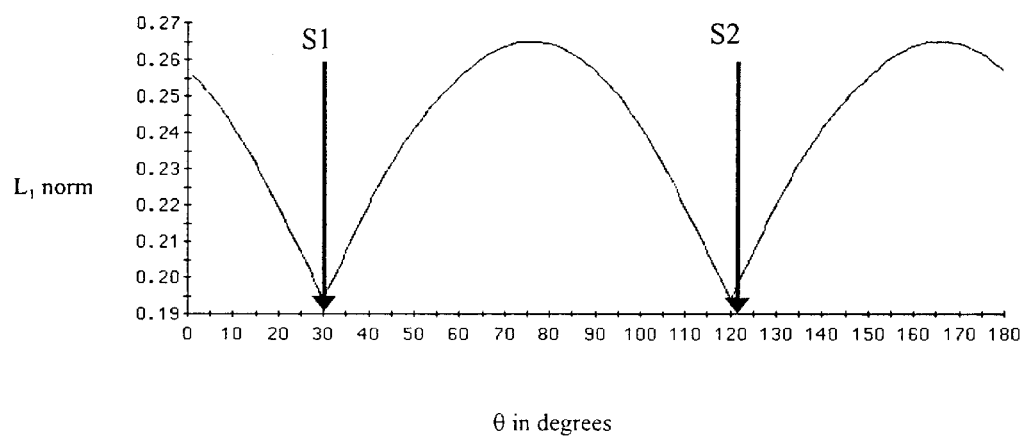
FIG. 6 shows the result of applying the $L_1$ norm to the X and Y traces of FIG. 2b for different rotation angles; it shows that the $L_1$ norm is minimised at 30 and 120 degrees, corresponding to the S1 and S2 directions, respectively.

FIG. 6 shows the value of the total $L_1$ norm, as given by equation (5) and applied to the X and Y traces of FIG. 2b, plotted against the rotation angle. This displays two clear minima at the angle values of 30 and 120 degrees, corresponding to S1 and S2 directions.

In practice, the $L_1$ norm is not the most convenient one to use, as finding the solution of the rotation angle requires the brute force scanning approach described above. That is, it is necessary to calculate the norm for each increment of, say 1 degrees, in order to find the value of θ corresponding to the minimum value of the norm. A better choice is the $L_4$ norm, for which an analytical treatment is possible.

The $L_4$ norm of the i-th trace samples of the rotated traces, $X^R$ and $Y^R$, is written for each angle θ as follows:

$$l^{(4)}{}_i(\theta)=[x_i^R(\theta)]^4+[y_i^R(\theta)]^4=[x_i \cos\theta+y_i \sin\theta]^4+[x_i \sin\theta-y_i \cos\theta]^4$$

The total $L_4$ norm over a time window with N samples is then given by:

$$L_4(\theta) = \sum_{i=1}^{N} l^{(4)} i(\theta) \quad (7)$$

This can be differentiated with respect to the e angle to find that the $L_4$ norm has its extreme values for $$\theta = \pm\arcsin\sqrt{\frac{1}{2}\left\{1 \pm \sqrt{\frac{1}{2\Gamma}\left(\Gamma \pm \sqrt{\Gamma K_1^2}\right)}\right\}} \quad (8)$$

where:

$$K_1 = \sum_{i=1}^{N} [x_i^4 - 6x_i^2 y_i^2 + y_i^4] \quad (9)$$

$$K_2 = \sum_{i=1}^{N} [x_i y_i (x_i^2 - y_i^2)]$$

$$\Gamma = K_1^2 + 16K_2^2$$

There are eight solutions given by equation (8), four of which are spurious. Of the remaining four, two give the $L_4$ minima and two give the $L_4$ maxima. In order to identify the desired solution we substitute them into the $L_4$ norm equation (7) and select one of the two valid solutions that produces the same maximum value for $L_4$. These two solutions represent the angle between the X axis and the S1 and S2 directions. It is not important which of the two solutions are selected at this stage, as the next step (i.e. cross-correlation) will help to distinguish between the fast and slow shear directions.

Figure 7:
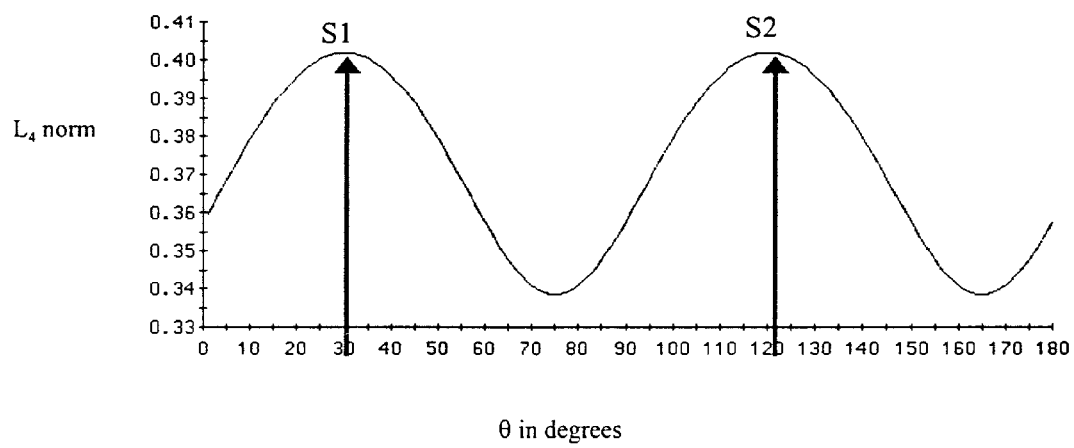
FIG. 7 shows the result of applying the $L_4$ norm to the X and Y traces of FIG. 2b for different rotation angles; it shows that the $L_4$ norm is maximised at 30 and 120 degrees, corresponding to the S1 and S2 directions, respectively.

FIG. 7 shows the value of the total $L_4$ norm, as given by equation (7) and applied to the X and Y traces of FIG. 2b, plotted against the rotation angle. This displays maxima at the angle values of 30 and 120 degrees, corresponding to S1 and S2 directions. There are some important advantages in using the Minimum Entropy Rotation method described here. For single source component data, most of the existing methods used for estimating the shear wave splitting parameters assume that the shear wave is equally reflected and transmitted in both the S1 and S2 directions. In general, this assumption is not always true, hence the strength of the invention presented here which does not require making this assumption. It is our observation that the method is also not very sensitive to noise. This could be explained as follows: due to additive noise, the samples may not lie on the S1 and S2 axes, but can be expected to have a mean value which approximately does; provided enough samples are included in the analysis and the noise is not correlated with a particular polarisation direction, the estimation will still behave well.

As well as the angles giving the polarisation directions of $S_1$ and $S_2$, an important shear wave splitting parameter is the travel time delay between the fast and slow shear waves. This may be obtained by cross-correlation of the two rotated traces at one of the minimum $L_1$ or maximum $L_4$ positions. The maximum cross-correlation output is picked to determine:

1. Which of the two traces contains the fast shear (i.e. the first arrival).
2. The travel time delay between the fast and slow shear arrivals.

Figure 8:
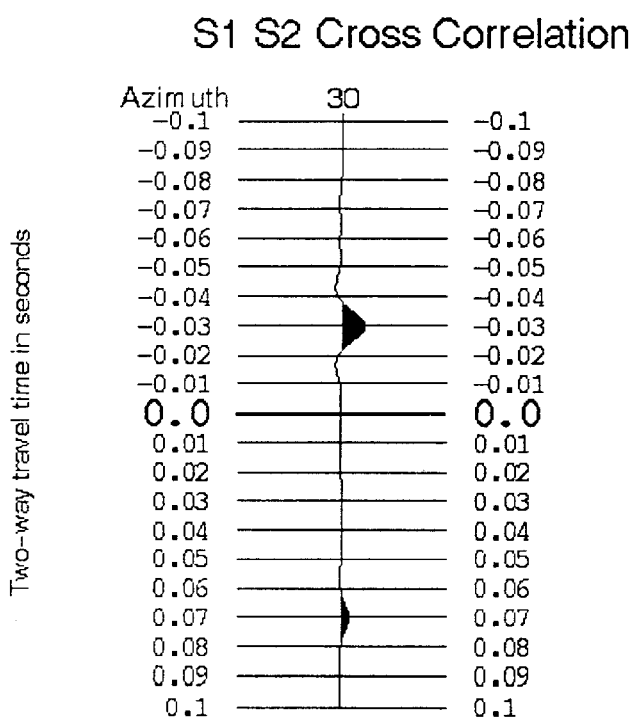
FIG. 8 shows the estimation of the travel time delay by cross-correlation of $Y^R$ with $X^R$; the peak occurs at –30 ms, meaning that the rotated $X^R$ component is in the fast S1 direction, and that the lag between the $S_1$ and $S_2$ shear waves is 30 ms.

FIG. 8 shows the cross correlation of the $Y^R$ with the $X^R$ traces rotated to 30 degrees. The negative time of the peak indicates that the $X^R$ trace is the fastest, whilst the time of 30 ms indicates the delay time between the fast and the slow shear waves. There is a secondary peak, which is due to a second event on the input traces.

What is claimed is:

1. A method of determining the polarisation directions of fast and slow shear waves arising from shear wave splitting due to anisotropy, said directions defining a natural coordinate system, the method comprising:
    a) recording two components of each shear wave in a recording coordinate system,
    b) calculating the value of θ, being the angle of rotation between the natural coordinate system and the recording coordinate system, for which the $L_p$ norm is minimized if p is less than 2, or maximized if p is greater than 2, using the two recorded components.

2. A method as claimed in claim 1, wherein said value of θ is determined by calculating the value of the $L_p$ norm over a range of incrementally varying values of θ and selecting that value of θ for which the $L_p$ norm is appropriately minimised or maximised.

3. A method as claimed in claim 1, wherein p is 4, and wherein the value of θ is calculated using an equation derived by differentiating the $L_p$ norm with respect to θ.

4. A method as claimed in claim 1, wherein the two recorded components of each shear wave are sampled at about 4 ms intervals.

5. A method as claimed in claim 1, wherein the fast and slow shear waves are recorded using two orthogonal geophones arranged generally parallel to the surface of the earth.

6. A method as claimed in claim 1, which involves producing the fast and slow shear waves from a single source.

7. A method as claimed in claim 6, wherein said source is a P-wave source.

8. A method as claimed in claim 1, wherein said components are horizontal components.

9. A method of determining the polarisation directions of fast and slow shear waves arising from shear wave splitting due to anisotropy comprising recording at least two components of each shear wave; and calculating the value of θ using the two recorded components.

10. A shear wave analysis apparatus for determining the polarization directions of fast and slow shear waves arising from shear wave splitting due to anisotropy comprising:

shear wave detection means for recording two components of each shear wave; and
    data processing means for calculating the value of θ using the two recorded components.

11. A computer readable medium carrying a computer program adapted to cause a computer to carry out a method comprising:
    a) recording two components of each shear wave, in a recording coordinate system,
    b) calculating the value of θ, being the angle of rotation between the natural coordinate system and the recording coordinate system, for which the $L_p$ norm is minimized if p is less than 2, or maximized if p is greater than 2, using the two recorded components.

* * * * *